United States Patent
Agee (10) Patent No.: US 9,067,289 B2
(45) Date of Patent: Jun. 30, 2015

(54) HEAT EXCHANGER WITH TELESCOPING EXPANSION JOINT

(71) Applicant: HONEYWELL INTERNATIONAL INC., Morristown, NJ (US)

(72) Inventor: Keith Agee, Torrance, CA (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 293 days.

(21) Appl. No.: 13/763,938

(22) Filed: Feb. 11, 2013

(65) Prior Publication Data

US 2014/0223738 A1   Aug. 14, 2014

Related U.S. Application Data

(62) Division of application No. 13/089,276, filed on Apr. 18, 2011, now Pat. No. 8,393,382, which is a division of application No. 11/696,871, filed on Apr. 5, 2007, now abandoned.

(51) Int. Cl.
*F28F 9/02* (2006.01)
*B23P 15/26* (2006.01)
*F28D 7/16* (2006.01)

(52) U.S. Cl.
CPC ............. *B23P 15/26* (2013.01); *Y10T 29/4935* (2015.01); *F28D 7/16* (2013.01)

(58) Field of Classification Search
CPC ............ F02B 29/0425; F02B 29/0462; F02M 25/0732; F02M 25/0737; F16J 15/02; F28B 1/02; F28D 7/10; F28D 7/16; F28D 7/1607; F28D 7/1638; F28D 7/2669; F28F 9/00; F28F 9/0236; F28F 9/0239; F28F 9/0241; F28F 9/02; F28F 9/26
USPC ......... 29/890.03; 165/157, 158, 159, 176, 67, 165/83
See application file for complete search history.

(56) References Cited

U.S. PATENT DOCUMENTS

| | | |
|---|---|---|
| 1,891,607 A | 12/1932 | Rainey |
| 2,191,179 A | 2/1940 | O'Donnell |

(Continued)

FOREIGN PATENT DOCUMENTS

| | | |
|---|---|---|
| EP | 1900931 A1 | 3/2008 |
| FR | 1001826 A | 2/1952 |

(Continued)

OTHER PUBLICATIONS

European Search Report dated Jun. 28, 2013.

(Continued)

*Primary Examiner* — David Bryant
*Assistant Examiner* — Jun Yoo
(74) *Attorney, Agent, or Firm* — Shimokaji IP (57) ABSTRACT

A heat exchanger comprises a shell comprising a hollow shell body and separate shell end members attached thereto. A number of tubes is disposed within the shell body which is sized to permit both ends of the tubes to project outwardly therefrom to facilitate access for attaching the tubes ends to respective tube header plates, after which time the shell end members are slid over the shell body towards the shell body ends for attachment to respective header plates. The heat exchanger can include an expansion element attached between a shell end member and the shell body, wherein the expansion element is positioned adjacent a slidable joint formed by an overlapping section of the shell body and shell end member. Together, the expansion element accommodates axial movement and the slidable joint carries vibration loads between the shell body and shell end member.

3 Claims, 6 Drawing Sheets

(56) References Cited

U.S. PATENT DOCUMENTS

| | | |
|---|---|---|
| 2,336,879 A | 12/1943 | Mekler |
| 2,607,567 A | 8/1952 | Hobbs et al. |
| 2,783,980 A | 3/1957 | Christensen |
| 2,933,291 A | 4/1960 | Huggins et al. |
| 3,111,167 A * | 11/1963 | Young .................. 165/158 |
| 3,189,086 A | 6/1965 | Esser et al. |
| 3,822,741 A | 7/1974 | Lippitsch |
| 4,266,600 A | 5/1981 | Bieberbach |
| 7,267,160 B2 | 9/2007 | Shincho et al. |
| 2003/0010480 A1 | 1/2003 | Shibagaki et al. |
| 2003/0196781 A1 | 10/2003 | Wanni et al. |
| 2004/0182547 A1 | 9/2004 | Birkert et al. |
| 2005/0067153 A1 | 3/2005 | Wu et al. |
| 2005/0224213 A1 | 10/2005 | Kammier |
| 2006/0102321 A1 * | 5/2006 | Shincho et al. .................. 165/81 |
| 2006/0225872 A1 | 10/2006 | Shibagaki et al. |

FOREIGN PATENT DOCUMENTS

| | | | |
|---|---|---|---|
| FR | 1348209 A | 1/1964 |
| FR | 2636416 A1 | 3/1990 |
| JP | H11159993 A | 6/1999 |

OTHER PUBLICATIONS

Eurpean Examination Report dated Sep. 23, 2013.
United States Patent &I Trademark Office, Office Action for U.S. Appl. No. 11/696,871, dated Sep. 2, 2010.
United States Patent & Trademark Office, Office Action for U.S. Appl. No. 13/089,276, dated Jul. 24, 2012.

* cited by examiner

HEAT EXCHANGER WITH TELESCOPING EXPANSION JOINT

CROSS-REFERENCE TO RELATED APPLICATIONS

This application is a divisional application of pending U.S. patent application Ser. No. 11/696,871, filed Apr. 5, 2007, and pending U.S. patent application Ser. No. 13/089,276, filed Apr. 18, 2011, the contents of which are herein incorporated by reference.

FIELD OF INVENTION

This invention relates generally to the field of heat exchangers and, more particularly, to heat exchangers that are specially designed to accommodate the thermal expansion and contraction characteristics as well as minimize thermal stresses associated therewith that are known to occur in conventional shell and tube type heat exchangers.

BACKGROUND OF THE INVENTION

The present invention relates to heat exchangers that are generally configured comprising a number of internal fluid or gas passages disposed within a surrounding body. In an example embodiment, the internal passages are designed to accommodate passage of a particular fluid or gas in need of cooling, and the body is configured to accommodate passage of a particular cooling fluid or gas used to reduce the temperature of the fluid or gas in the internal passages by heat transfer through the structure of the internal passages. A specific example of such a heat exchanger is one referred to as a shell and tube exchanger, which can be used in such applications as exhaust gas cooling for internal combustion engines, e.g., for use in exhaust gas recirculation systems or the like.

Figure 1:
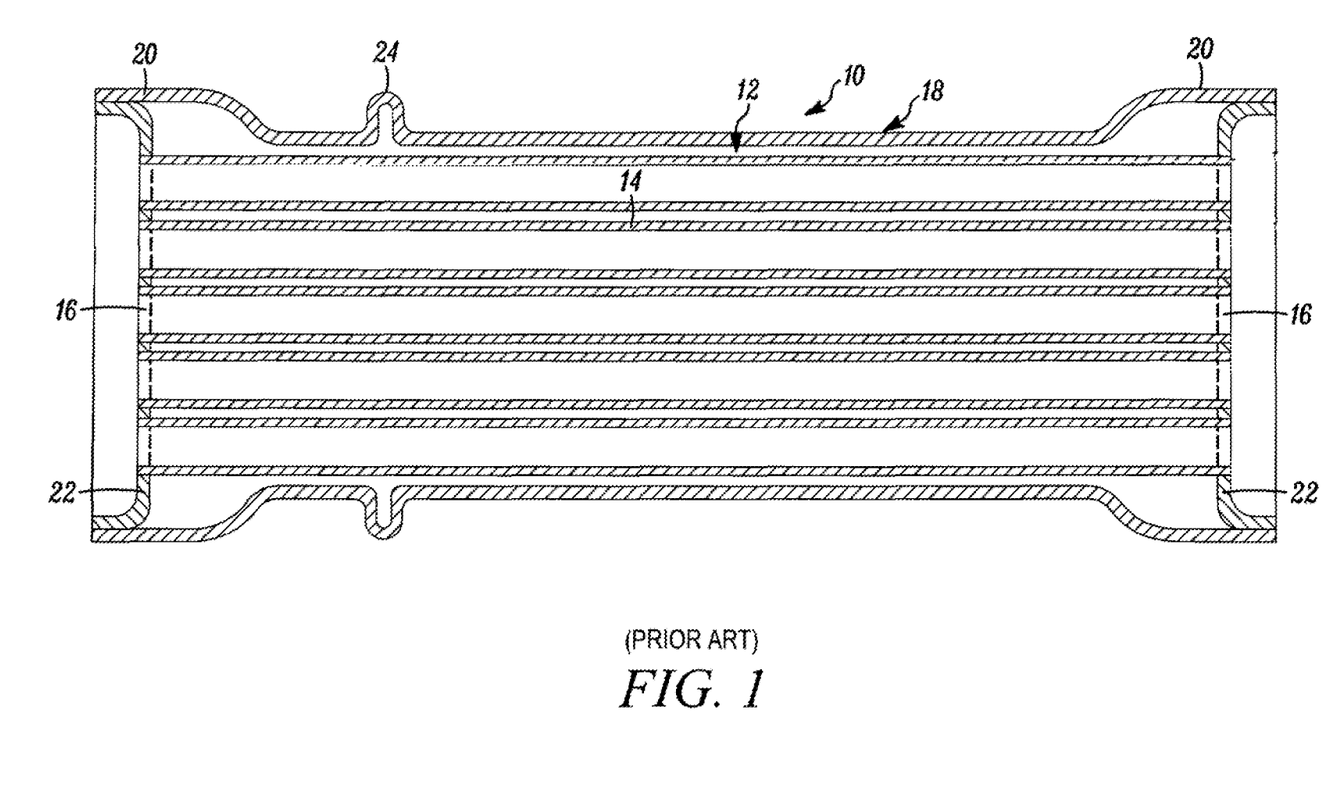
FIG. 1 is a cross-sectional side view of a prior art shell and tube heat exchanger.

FIG. 1 illustrates a known shell and tube type heat exchanger 10 that is disclosed in U.S. Patent Publication No. 2004/0182547 and that generally includes a tube bundle 12 formed from a number of individual tubes 14, i.e., internal passages, that are aligned together, positioned next to one another, and that have one or both openings at the tube ends 16 positioned adjacent one another. The tube bundle 12 is disposed within a surrounding body or jacket 18. The body is configured having an inlet and outlet (not shown) to facilitate the passage of a cooling medium such as a fluid or gas into and out of the shell.

In the particular embodiment illustrated in FIG. 1, the body or jacket is of a one-piece construction that has enlarged or flared-out end portions 20 that are sized and shaped to extend over tube plates 22 that are disposed within and attached to respective end portions 20, and which tube plates are used to join the tubes together adjacent axial tube ends.

A problem known to exist with such shell and tube type heat exchanges is that the tubes and tube bundle, being subjected to relatively hotter fluids or gasses than that of the heat exchange body or jacket, tends to undergo a degree of thermal expansion that is greater than that of the body or jacket, which if not addressed is known to cause thermal stresses to occur within the heat exchanger that can lead to a mechanical failure, thereby reducing the exchanger service life.

Attempts have been made to address the presence of such unwanted thermal stresses in shell and tube heat exchangers. For example, the heat exchanger illustrated in FIG. 1 has been configured having a body or jacket that includes an expansion bead 24 extending around the body or jacket. In this embodiment, the expansion bead 4 basically comprises a section of the body or jacket that has been deformed outwardly in the form of rounded surface feature that, moving axially along the section, projects outwardly 90 degrees to a rounded closed end that projects inwardly to the body. The expansion bead is designed to permit the body to expand and/or contract as needed to accommodate thermal expansion and/or contraction of the tube bundle disposed therein.

An issue that exists with this design is that the expansion bead, while being configured to address axial-directed thermal expansion of the body, the expansion bead (like the remaining portion of the heat exchanger body) is also subject to vibration loads. To best function as a thermal expansion joint, the expansion bead material thickness should be minimized. However, a thinner material thickness weakens the structural integrity of the heat exchanger and its related ability to carry vibration loads during heat exchanger operation, thereby making such heat exchangers comprising the same subject to mechanical failure and reduced service life.

Additionally, heat exchangers such as that illustrated in FIG. 1 make assembly and/or connection of the tubes and tube plates difficult because at least one of the tube plates have to be attached to the respective tube ends while the tube plate and tube ends are disposed within the end of the body or jacket. The need to attach the tubes to the tube plate while both elements are disposed within the end of the body or jacket increases assembly time and makes accurate leaktight attachment between the tubes and tube plate a challenge.

It is, therefore, desired that a shell and tube heat exchanger be constructed in a manner that addresses the need to accommodate thermal expansion issues that are known to occur in such heat exchangers in a manner that reduces or eliminates thermal stresses from developing therein. It is desired that such construction accommodates the presence of such thermal expansion in a manner that does not otherwise impact the ability of the heat exchanger to carry the vibration loads known to exist for heat exchangers. It is further desired that such heat exchanger construction is configured to facilitate assembly of the heat exchanger elements, such as the tubes and tube plates relative to the heat exchanger body.

SUMMARY OF THE INVENTION

A heat exchanger constructed in accordance with principles of this invention generally comprises a shell including a shell body having a hollow inner chamber that is defined by an inside wall surface and opposed ends. In an example embodiment, the shell body is a one-piece configuration, i.e., made from a single piece of material. The shell further includes a pair of shell end members that are each attached to the shell body adjacent respective shell body ends.

A number of tubes, provided in an example embodiment in the form of a tube stack, are disposed within the shell body inner chamber. The tubes have opposed ends that are positioned within the shell body adjacent respective shell body ends. A pair of tube header plates that each comprise a number of openings to accommodate respective tube ends are positioned adjacent and to the respective tube ends. In an example embodiment, the shell body is sized having an axial length sized sufficiently less than that of the tube stack so that both of the tube ends project axially outwardly a distance therefrom to provide access thereto to facilitate attachment of the respective tube header plates. The tube header places are attached to respective shell end members to form a leak-tight seal between the tubes and the shell inner chamber.

In an example embodiment, each shell end member includes a first end that is configured to facilitate attachment over an outside surface of the shell body, and includes a second end that is configured to accommodate the tube header plate therein. In such example embodiment, the shell end member first end is sized smaller than the second end. Further, in an example embodiment, the shell end member second end projects axially a distance from the shell body end, and the shell end member is attached to the tube header plate an axial distance from the end of the shell body.

In an example embodiment, heat exchangers of this invention may further include an expansion element that extends around the shell and that is interposed between the shell body and one of the shell end members. The expansion element comprises a first end that is attached to an end of the shell end member, and an opposed second end that is attached to the shell body.

In an example embodiment comprising such expansion element, an axial length of the shell body end is positioned within the shell end member so that the shell member end overlaps the shell body a determined length. The overlapping arrangement between the end sections of the shell body and shell end member operates to both carry any vibration loads than may occur, as well as permit axial movement between the shell end member and shell body, during heat exchanger operation.

Configured in this manner, heat exchanger constructions of this invention accommodate thermal expansion issues that are known to occur during operation in a manner that reduces or eliminates thermal stresses from developing therein. The overlapping joint structure between the shell body and shell end member in conjunction with the expansion element, that is attached between the overlapping shell body and end member sections operates to accommodate the presence of such thermal expansion in a manner that does not otherwise impact the ability of the heat exchanger to carry vibration loads known to exist during heat exchanger operation. Further, the particular construction of the shell body and shell end members operates to facilitate assembly of the heat exchanger tubes and tube plates, thereby improving assembly and manufacturing efficiency.

BRIEF DESCRIPTION OF THE DRAWINGS

The invention will be more clearly understood with reference to the following drawings wherein.

DETAILED DESCRIPTION OF THE INVENTION

The present invention relates to heat exchangers used for reducing the temperature of an entering gas or fluid stream. A particular application for the heat exchangers of this invention is with vehicles and, more particularly, is to cool an exhaust gas stream from an internal combustion engine. However, it will be readily understood by those skilled in the relevant technical field that the heat exchanger constructions of the present invention described herein can be used in a variety of different applications.

Generally, the invention constructed in accordance with the principles of his invention, comprises a heat exchanger including a three-piece construction that includes a pair of shells end members to a shell body. The heat exchanger can further comprise an expansion element that is attached between the shell body and a shell end member, wherein the attachment is designed to accommodate a desired degree of thermal expansion and/or contraction axial movement without sacrificing the ability of the heat exchanger to accommodate vibration stress.

Figure 2:
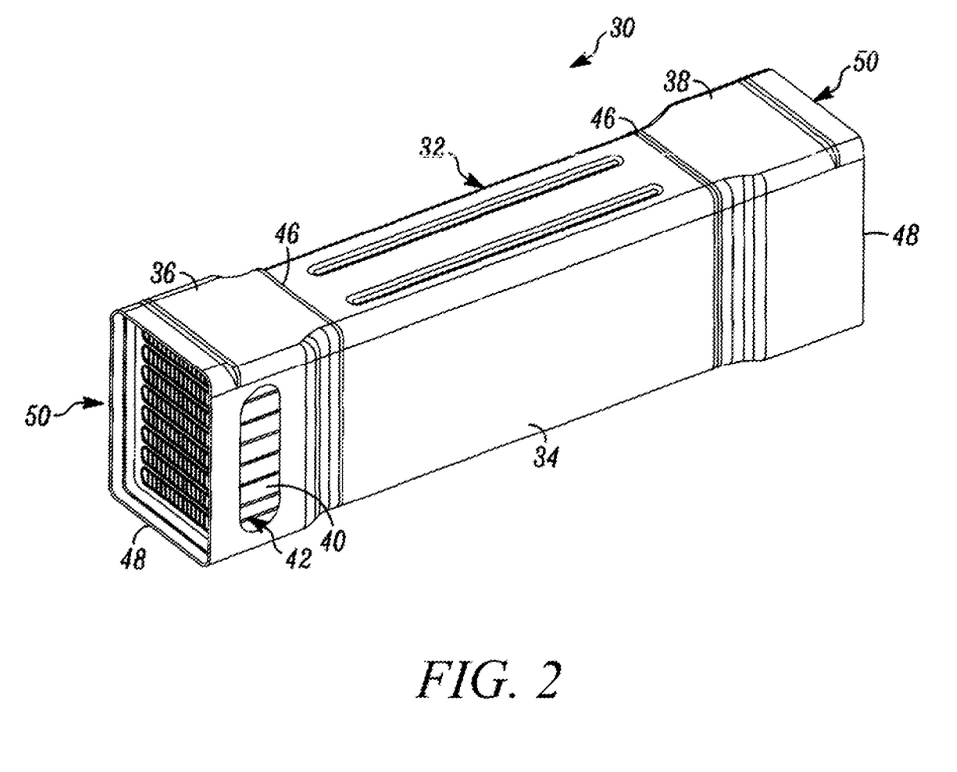
FIG. 2 is a perspective side view of a first embodiment heat exchanger constructed according to principles of the invention.

FIG. 2 illustrates a first embodiment heat exchanger construction 30 of this invention generally comprising a shell 32 that includes a shell body 34 and shell end members 36 and 38 that are attached at opposed ends of the body 34. The shell body 34 is generally a hollow member having a one-piece construction formed from a structurally rigid material that is well suited for use in a heat exchanger application, such as metals and their alloys that are used to form shells used in conventional heat exchangers. In a preferred embodiment, where the heat exchanger is used to reduce the temperature of an incoming exhaust gas stream from an internal combustion engine, the shell is formed from stainless steel. The shell body is configured having a generally rectangular cross-sectional geometry.

The shell body 34 is sized and configured to accommodate a number of tubes 40 therein. The tubes can have different cross-sectional shapes depending on the particular end-use application. In an example embodiment, the tubes 40 are configured having an elongate cross-sectional shape. Additionally, the tubes may comprise one or more element disposed therein for the purpose of providing a desired number of passages within the tube and/or for the purpose of adding compressive strength to the tubes, e.g., to facilitate stacking tubes on one another to form a tube bundle or tube stack 42.

In an example embodiment, the shell body 34 has an axial length that is less than that of the tube length. As better described below, the shell body is designed in this manner to function with the shell end members to facilitate assembly of the individual tubes 40 with respective tube or header plates 44 (shown in FIG. 4) positioned at each of the tube ends. The shell body can be made by molding process or the like. In a preferred embodiment, the shell is made by hydroforming or end expanding a seam welded rectangular tube.

The shell end members 36 and 38 each include a first axial end 46 that is sized to over an adjacent end section of the shell body 34, and a second axial end 48 that is sized to accommodate placement and attachment of a respective header plate 44 therein. In an example embodiment, the shell end member second end is sized having an enlarged opening when compared to that of the second end. Although the shell end members have been described in an example embodiment and illustrated as having different sized openings at the first and second ends, it is to be understood that heat exchangers of this invention can be configured differently, e.g., having shell end members with the same or similar sized openings at the first and second ends. The shell end members can be formed from the same material used to form the shell body.

The shell end members 36 and 38 include ends 50 that define opposed ends of the heat exchanger construction. These ends 50 can be configured to includes surface features, such as flanges or the like, that are designed to facilitate use and attachment of the ends 50 as respective heat exchanger inlets and outlets to the end-use device or system by appropriate connection means.

The shell includes a cooling fluid inlet (not shown) and a cooling fluid outlet (not shown) that generally extends through a wall section of the shell body or shell end member, and that is used to facilitate the respective transport of a cooling medium, e.g., a cooling fluid, into and out of the heat exchanger. Upon entering the shell, the cooling medium contacts the external surface of the tubes to cause a reduction in temperature of the fluid or gas passing through the tubes.

Figure 3A:
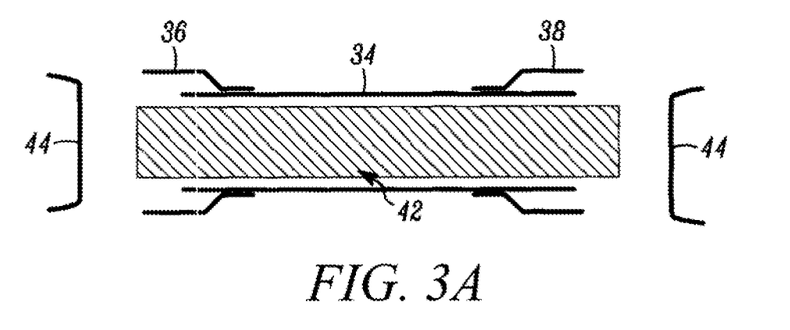
FIGS. 3A to 3C are cross-sectional schematic views of the heat exchanger of this invention at different stages of assembly.
Figure 3B:
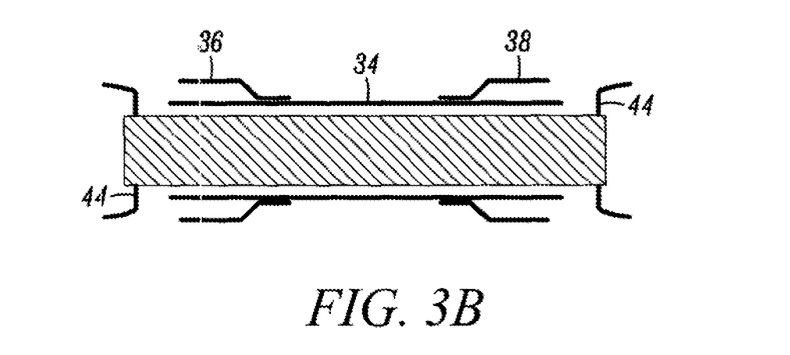
Figure 3C:
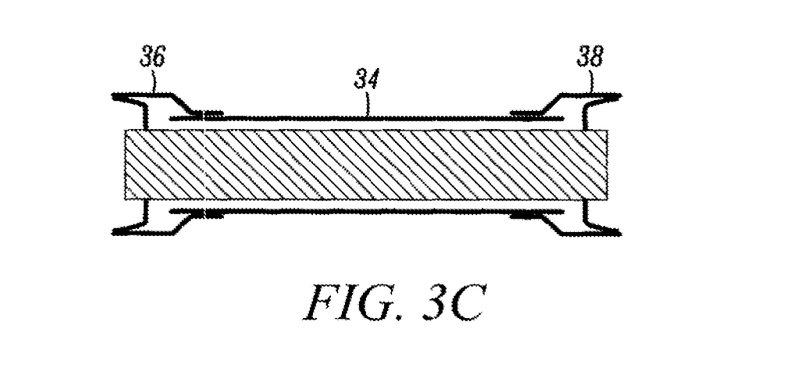

FIGS. 3A to 3C illustrate a heat exchanger construction of this invention at different stages of assembly. FIG. 3A illustrates an early stage of heat exchanger assembly where the tube stack 42 or number of tubes are disposed within the hollow open chamber of the shell body 34.

As illustrated, the shell body 34 is sized axially so that a desired portion of the tube end project outwardly therefrom. In an example embodiment, the amount that the tube ends project from the shell body is an amount that is sufficient to provide easy access for attaching the tube or header plates 44 to each of the respective ends of the tubes.

Figure 4:
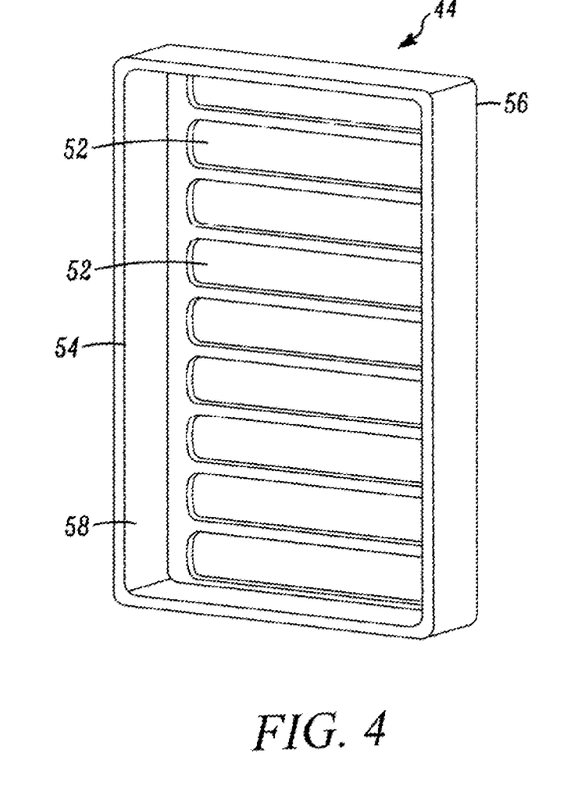
FIG. 4 is a perspective side view of a header plate for use with the heat exchanger of this invention.

As best shown in FIG. 4, the header plates 44 that are disposed within the heat exchanger shell end members are each configured having inside surface features 52 that are configured and sized to extend around respective opposed ends of the tube stack. The header plates 44 have an outside surface that is generally rectangular in shape and that comprises a lip 54 that is configured and sized to complement and fit within an inside wall surface of each respective shell end member. The header plate 44 preferably includes a shoulder 56 that defines a transition between a main body 58 of the header plate 44 comprising the surface features or openings 52, and the lip 54. The header plate shoulder 56 is sized and configured to provide a cooperative nesting fitment within a complementary surface feature of an inside wall surface of the shell end member. If desired, the header plates 44 can also be configured having a self-fixturing or registering means disposed along an outside surface for placing it in a particular position with respect to the shell end member during assembly and brazing.

Before attaching the header plates 44 to the respective ends of the tubes, the shell end members 36 and 38 are engaged with the respective ends of the shell body and are slid inwardly towards one another to allow free access to the shell body ends. Thus, as illustrated in FIG. 3A, the shell end members are placed in a retracted position along the shell body in anticipation of attaching the tube headers to the respective ends of the tubes.

FIG. 3B illustrates a stage of heat exchanger assembly where the tube headers 44 have been attached to the respective tube ends. Such attachment can be provided by conventional method such as by welding, brazing or the like. As illustrated in FIG. 3B, the construction feature of using shell end members 36 and 38 that are separate from the shell body 34, when placed in the retracted position along the shell body, provides for the attachment of the header plates onto the respective ends of the tubes without unwanted interference, thereby helping to ensure that all needed attachment points are thoroughly provided to result in a leak-tight seal therebetween.

FIG. 3C illustrates a later stage of heat exchanger assembly where the shell end members 36 and 38 have been slid outwardly away from one another along the shell body 34 towards the now attached respective tube headers. During this stage of assembly, the tube header plates are attached to the inside wall surface of the respective shell end members, e.g., by conventional method of brazing, welding or the like. Attaching the header plates to the inside wall surface of the shell end members, e.g., by brazing or welding process, helps to provide a sealed coolant passage. During this later stage of assembly, the shell end members are also attached to the shell body, e.g., by welding, brazing or the like.

Figure 5:
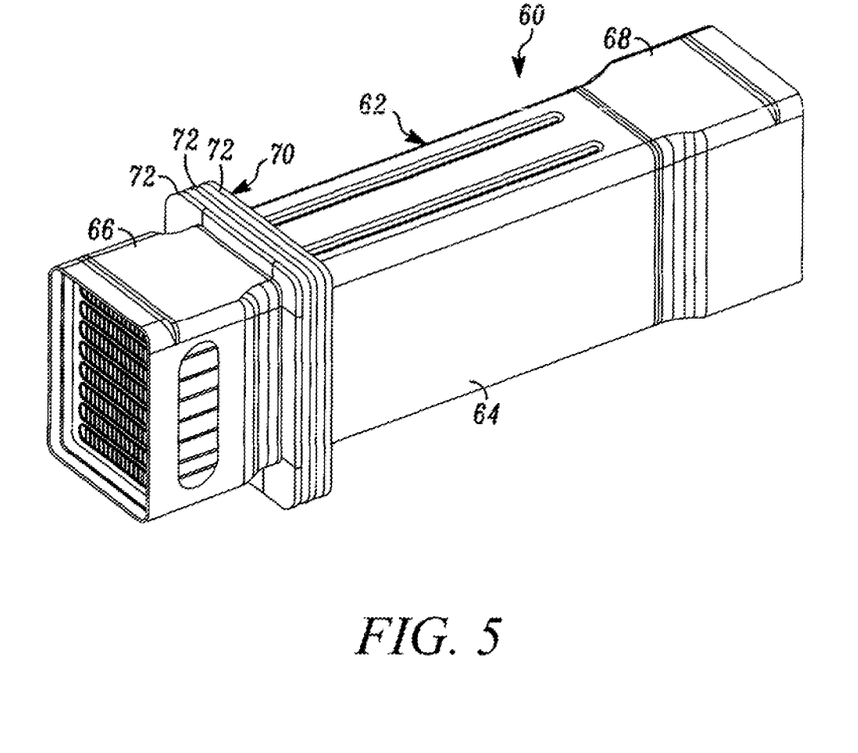
FIG. 5 is a perspective side view of a second embodiment heat exchanger constructed according to principles of the invention.

FIG. 5 illustrates a second embodiment heat exchanger construction 60 of this invention generally comprising the same elements disclosed above for the first embodiment illustrated in FIG. 2. Namely, the heat exchanger comprises a shell 62 formed from a shell body 64 and shell end members 66 and 68 attached to opposed ends of the body 64. Unlike the embodiment of FIG. 2, in this heat exchanger embodiment the shell also includes an expansion element 70. The expansion element, its attachment configuration, and the configuration of attachment between the shell body and at least one of the shell end members function together to accommodate thermal expansion movement of the shell while also not sacrificing structural stability necessary for accommodating vibration stresses during heat exchanger operation.

In an example embodiment, the expansion element 70 is configured having a structure designed to accommodate a desired degree of axially directed expansion and contraction, e.g., contraction from an expanded condition. In an example embodiment, the expansion element is configured having an accordion or bellowed structure comprising one or more outwardly projecting members that are connected to one another by a web section. As illustrated in FIG. 5, in a preferred embodiment, the expansion element 70 has an accordion structure comprising three outwardly projecting members 72. It is to be understood that the exact configuration of the expansion element, and the number of members making up the same, can and will vary depending on a number of factors such as the amount of expansion movement needed to be accommodated as well as the particular end use application.

Figure 6A:
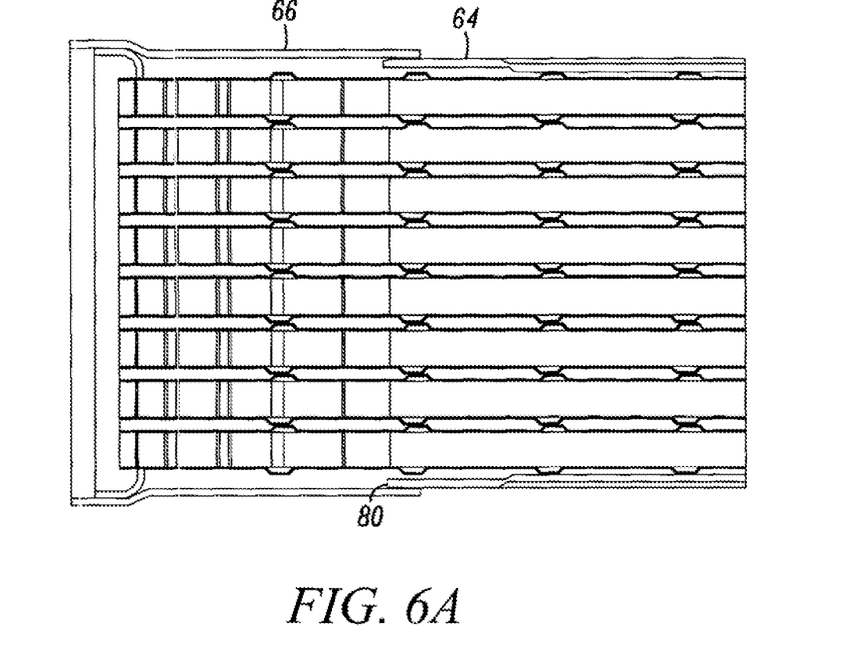
FIGS. 6A and 6B are cross-sectional side views of sections of the heat exchanger illustrated in FIG. 5.
Figure 6B:
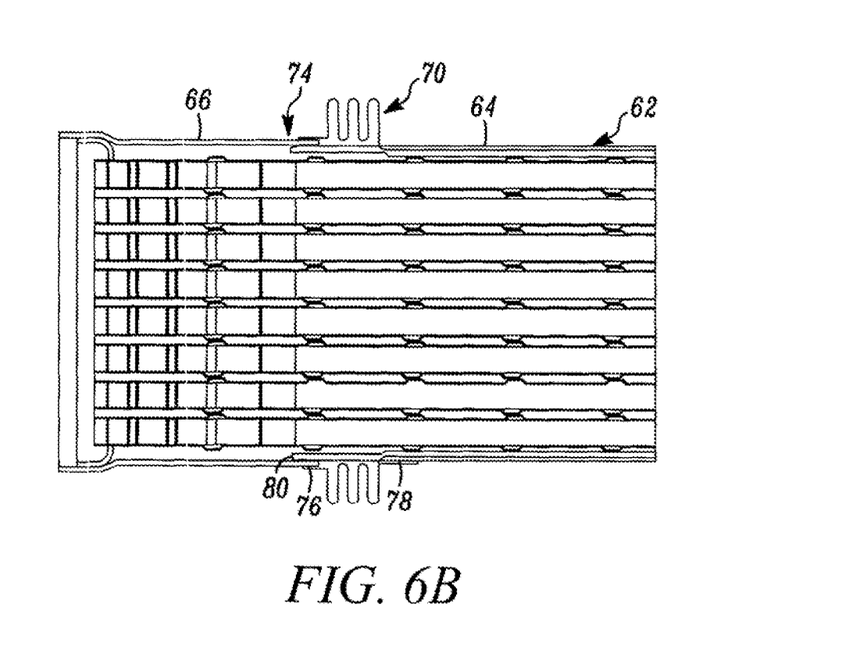

As best illustrated in FIG. 6B, the expansion element 70 is positioned along the shell 62 between the shell body 64 and one of the shell end members 66. In an example embodiment, the expansion element 70 extends completely around the shell 62 and includes a first end 74 that is configured for attached to an end 76 of the shell end member 66. The expansion element first end 74 can include a collar sized to extend around an outside surface of the shell end member 66, and an inside edge that is positioned to for placement against an edge surface of the shell end member end 76. The expansion element 70 first end 74 is attached to the shell end member 66 by brazing, welding, or the like.

The expansion element 70 includes a second end 78 that is configured for placement over a section of the shell body 64 and attachment thereto. In an example embodiment, the expansion element second end 78 is provided in the form of an axially extending collar that extends around a section of the shell body 64 adjacent a shell body end 80. The expansion element second end 72 attached to the shell body by welding, brazing, or the like.

As illustrated in FIG. 6A, before attaching the expansion element, it is desired that the shell end member 66 be slid over the end 80 of the shell body 64 so that a desired portion of the shell body is positioned within the shell end member. This overlapping attachment between the shell end member and shell body is desired for the purpose of providing shell structure that is capable of providing a desired degree of load carrying ability independent of the expansion element, i.e., so that the expansion element can function to provide the desired degree of thermal expansion movement desired without having to also function to carry loads such as those induced by vibration or the like. The presence of such an overlapping attachment, between the shell body and shell end member, that is provided beneath the extension element, provides a structure capable of accommodating thermal expansion movement without adversely impacting the load carrying, e.g., from vibration stress or the like, of the construction.

It is desired that the tolerance between the inside surface of the shell end member 66 and the outside surface of the shell body 64 be as small as possible from a manufacturing and assembly standpoint, but be sufficient to enable the shell end member and shell body to move axially relative to one another without binding. In an example embodiment, the tolerance between the two surfaces is in the range of from about 0.15 to 0.8 millimeters, and preferably in the range of from about 0.25 to 0.5 millimeters. Additionally, the desired degree of overlap between the shell end member and shell body should be sufficient to provide the desired degree of structural strength and load carrying ability. In an example embodiment the overlap is in the range of from about 10 to 40 millimeters, and preferably in the range of from about 15 to 30 millimeters.

If desired, the sections of the of the heat exchanger shell body and/or the shell end member that are in sliding contact with one another can be coated or otherwise treated to provide a low friction surface, e.g., to facilitate sliding movement of the shell body and shell end member relative to one another during heat exchanger operation. One or both of the opposed and overlapping adjacent shell body and/or shell end member surfaces can be configured to include this feature depending on the particular heat exchanger embodiment and/or end use application.

While the heat exchanger construction embodiment described above and illustrated in FIG. 5 illustrates use of one expansion element 70 positioned at one end of the shell, it is to be understood that heat exchangers of this invention can comprise the expansion element positioned at the opposite end of the shell, or can comprise two expansion elements positioned at respective shell ends. However, for practical purposes, only one expansion element is useful for meeting the thermal expansion needs of most heat exchanger applications.

In general, the entire assembly is preferably made of metals and metal alloys, such as stainless steel of the like, and the assembly elements are brazed using a braze material that is compatible with the selected metal or metal allow, e.g., with a nickel-based braze material or the like when the selected material useful for making the heat exchanger elements is stainless steel.

The heat exchanger as constructed in accordance with the principles of this invention functions in the following manner. The desired fluid or gas to be cooled is directed into the heat exchanger via an inlet opening defined by one of the shell end members. A coolant fluid is passed into the heat exchanger via an inlet opening through the shell and is passed to the plurality of tubes making up the tube stack. A coolant flow path is defined within the shell between an inside wall surface of the shell body and by the tube stack. The coolant operates to reduce the temperature of the gas or fluid being passed through the tube stack via thermal heat transfer, and the cooled gas or fluid exits the heat exchanger via an outlet opening defined by the other shell end member. Coolant passes out of the heat exchanger after contacting the tube stack via an outlet in the shell.

It is to be understood that the embodiments described above and illustrated are but examples of examples embodiments of heat exchangers as constructed according to principles of this invention, and that those skilled in the art will recognize modifications and substitutions to the specific embodiments disclosed herein. Such modifications are within the scope and intent of the present invention.

What is claimed is:

1. A method for making a shell and tube heat exchanger comprising a plurality of tubes disposed within a shell, the method comprising the steps of:
   placing a number of tubes within a body of the shell, wherein the body has an axial length sized to permit opposed ends of the tubes to project outwardly a distance from opposed shell body ends, the shell including a pair of shell end members slidably disposed along an outside surface of the shell body away of the shell body ends to provide access to the tube ends;
   fixedly attaching tube header plates to the opposed tube ends;
   moving the shell end members along the shell body towards the tube header plates;
   fixedly attaching the shell end members to respective tube header plates and attaching the shell end members to the shell body;
   before the step of attaching the shell end members to the body, attaching an expansion element that is positioned around the shell body, wherein the expansion element is attached at one end to an end of one of the shell end members opposite the respective tube header plate, and is attached an opposite end to a surface of the shell body, and wherein the expansion element facilitates expansion movement between the shell body and respective shell end member.

2. The method as recited in claim 1 wherein before the step of attaching the expansion element, the end of the shell end member to be attached thereto overlaps a desired section of the shell body to provide a desired degree of load carrying therebetween, and wherein the shell end member that is attached to the expansion element is not directly fixedly attached to the shell body.

3. The method as recited in claim 1 wherein the shell body section is disposed within the shell end member a distance in the range of from about 10 to 40 millimeters.

* * * * *